United States Patent
Bruns et al.

(10) Patent No.: US 7,726,745 B2
(45) Date of Patent: Jun. 1, 2010

(54) ADJUSTABLE ARMREST MECHANISM FOR A MATERIALS HANDLING VEHICLE

(75) Inventors: Eugene G. Bruns, Maria Stein, OH (US); Adam M. Ruppert, Wapakoneta, OH (US)

(73) Assignee: Crown Equipment Corporation, New Bremen, OH (US)

( * ) Notice: Subject to any disclaimer, the term of this patent is extended or adjusted under 35 U.S.C. 154(b) by 543 days.

(21) Appl. No.: 11/552,577

(22) Filed: Oct. 25, 2006

(65) Prior Publication Data

US 2007/0096531 A1    May 3, 2007

Related U.S. Application Data (60) Provisional application No. 60/730,581, filed on Oct. 27, 2005.

(51) Int. Cl.
*B60N 2/46* (2006.01)
(52) U.S. Cl. .................. 297/411.36; 297/411.38
(58) Field of Classification Search .......... 297/115, 297/411.32, 411.38, 411.3, 411.35, 411.36; 180/333, 334, 326; 248/118, 118.1, 118.3; 296/153, 1.02
See application file for complete search history.

(56) References Cited

U.S. PATENT DOCUMENTS

| | | | | | |
|---|---|---|---|---|---|
| 2,584,732 | A | * | 2/1952 | Okun | 297/411.25 |
| 4,244,623 | A | * | 1/1981 | Hall et al. | 297/411.36 |
| 4,478,308 | A | * | 10/1984 | Klaassen | 180/326 |
| 4,674,790 | A | * | 6/1987 | Johnson | 296/153 |
| 4,702,520 | A | * | 10/1987 | Whisler et al. | 297/411.36 |
| 4,877,287 | A | | 10/1989 | Escaravage | |
| 4,881,424 | A | * | 11/1989 | Clark et al. | 74/523 |
| 4,984,847 | A | * | 1/1991 | Bedu et al. | 297/411.38 |
| 5,161,760 | A | * | 11/1992 | Terbrack | 248/118 |
| 5,848,823 | A | * | 12/1998 | Su | 297/411.36 |
| 5,884,975 | A | * | 3/1999 | Su | 297/411.35 |
| 6,086,024 | A | * | 7/2000 | Congress | 248/118 |
| 6,132,001 | A | * | 10/2000 | Su | 297/411.36 |
| 6,164,285 | A | * | 12/2000 | Garberg et al. | 180/326 |
| 6,182,778 | B1 | | 2/2001 | Henshaw et al. | |
| 6,182,797 | B1 | | 2/2001 | Tebbe et al. | |

(Continued)

FOREIGN PATENT DOCUMENTS

DE    196 07 398 C1    1/1998

(Continued)

OTHER PUBLICATIONS

Mitsubishi Brochure for Stand-on Power Pallet 1.0t, PBR2OK, 2000, The Netherlands.

(Continued)

*Primary Examiner*—David Dunn
*Assistant Examiner*—James Alex
(74) *Attorney, Agent, or Firm*—Stevens & Showalter LLP (57) ABSTRACT

An adjustable armrest mechanism is provided, which is adapted to be coupled to a vehicle frame. The armrest mechanism comprises a base fixed to the vehicle frame, armrest apparatus movably coupled to the base such that the armrest apparatus pivots about a virtual pivot point located in front of the armrest apparatus and the base, and a locking device for releasably locking the armrest apparatus to the base in one of at least two positions.

19 Claims, 7 Drawing Sheets

U.S. PATENT DOCUMENTS

| | | | |
|---|---|---|---|
| 6,189,964 B1 | 2/2001 | Henshaw et al. | |
| 6,341,821 B1 * | 1/2002 | Rousseau | 297/411.36 |
| 6,352,133 B1 * | 3/2002 | Ojima | 180/326 |
| 6,634,453 B2 * | 10/2003 | Arthur et al. | 180/315 |
| 6,739,669 B2 * | 5/2004 | Etzioni et al. | 297/411.32 |
| 6,851,754 B2 * | 2/2005 | Bremner | 297/411.36 |
| 7,014,255 B2 * | 3/2006 | Amamiya et al. | 296/190.08 |
| 2004/0183355 A1 * | 9/2004 | Lee et al. | 297/411.36 |
| 2004/0245038 A1 | 12/2004 | Smiley et al. | |

FOREIGN PATENT DOCUMENTS

| | | |
|---|---|---|
| DE | 19607398 C1 | 1/1998 |
| DE | 20 2005 001386 U1 | 5/2005 |
| GB | 2 387 427 A | 10/2003 |

OTHER PUBLICATIONS

Crown Specifications RC 3000 Series for Stand-up Rider Lift Truck, SF12386, Rev. Jan. 2004, U.S.A.
News Page showing SA 2006 truck, Oct. 12, 2005.
News Page for Joystick or Electrical Guided Regulators, Jun. 2, 2006.
Photo of armrest on materials handling truck Jun. 2, 2006.
Photo of armrest taken at a tradshow in Germany on Oct. 11, 2005.

* cited by examiner

ADJUSTABLE ARMREST MECHANISM FOR A MATERIALS HANDLING VEHICLE

This application claims the benefit of U.S. Provisional Patent Application Ser. No. 60/730,581, filed Oct. 27, 2005, and entitled "ADJUSTABLE ARMREST MECHANISM FOR A MATERIALS HANDLING VEHICLE," the disclosure of which is incorporated herein by reference.

TECHNICAL FIELD

The present invention relates to a materials handling vehicle comprising an adjustable armrest mechanism adapted to accommodate a wide range of operator elbow and forearm positions.

BACKGROUND OF THE INVENTION

It is known in the prior art to provide armrests in materials handling vehicles. For example, U.S. Patent Application Publication 2004/0245038 A1 discloses an armrest provided with three separate armrest locations 40A-40C, each corresponding to an operator of a different size. As illustrated in FIG. 4 of the published application, armrest location 40B is spaced further away from an operator than armrest location 40A and armrest location 40C is spaced further away from an operator than armrest locations 40A and 40B. Hence, a taller operator must lean further to the side to rest his elbow than a shorter operator.

It is also known to provide an armrest and control handle assembly, which assembly is adjustable up and down along a linear path. This assembly is costly to manufacture due to the control handle moving with the armrest.

It is further known to provide a fixed armrest against which an operator may lean while driving a materials handling vehicle. However, such an armrest is uncomfortable for shorter operators as they are required to raise their elbows and forearms too high to rest against the fixed armrest. A fixed armrest is also uncomfortable for taller operators as they are required to lean too much to one side such that their elbows and forearms contact the armrest.

An alternative armrest, which allows for armrest adjustment to accommodate a wide range of operator elbow and forearm positions, is desired.

BRIEF SUMMARY OF THE INVENTION

The present invention relates to an armrest mechanism for a materials handling vehicle. In accordance with one embodiment, the armrest mechanism comprises armrest apparatus capable of pivoting about a virtual pivot point located in front of the armrest mechanism and a control handle to be gripped by an operator's hand. The armrest mechanism further includes a pad with a contoured receiving surface that slopes downwardly towards the control handle. Hence, operators of various heights may rest their elbow and forearm on the armrest mechanism, after an appropriate adjustment to the armrest apparatus has been effected, without being required to raise their elbow and forearm too high, drop their elbow and forearm too low or lean too much to the side to contact the armrest apparatus. Also, after an appropriate adjustment has been made to the armrest apparatus, such that an operator is resting his/her elbow and forearm comfortably on the armrest apparatus, the operator's hand and forearm are substantially in-line with one another, i.e., the operator's wrist is not substantially flexed up or down when the operator's hand is gripping a control handle positioned in front of the armrest mechanism. Due to the overall configuration of the armrest mechanism, the wrist of substantially all operators, including short and tall operators, after an appropriate armrest apparatus adjustment has been effected, is positioned in an ergonomically neutral posture or position, i.e., the wrist is not substantially flexed upward or downward, when the operator is gripping the control handle.

In accordance with a first aspect of the present invention, an adjustable armrest mechanism is provided coupled to a frame of a materials handling vehicle and spaced from a control handle also coupled to the vehicle frame. The armrest mechanism comprises a base fixed to the vehicle frame and located a distance from the control handle; an armrest apparatus movably coupled to the base; and a locking device for releasably locking the armrest apparatus to the base in one of at least two positions. The armrest apparatus is movably coupled to the base so that after an adjustment has been made to the armrest apparatus to any one of at least two spaced-apart positions, such that an operator is resting his/her elbow and forearm comfortably on the armrest apparatus, the operator's wrist is located in a neutral position. An operator's wrist is considered to be located in a "neutral position" when his/her wrist is not substantially flexed up or down when the operator's hand is gripping the control handle positioned in front of the armrest mechanism.

The armrest apparatus may comprise a mount structure including a side portion provided with at least one arc-shaped slot and an upper portion, and a pad positioned on the mount structure upper portion.

The base may comprise a support frame fixed to the vehicle frame and at least one guide member coupled to the support frame so as to remain in a fixed position on the support frame. The guide member may extend into the arc-shaped slot in the mount structure side portion such that the mount structure moves along an arc-shaped path relative to the support frame. It is contemplated that the mount structure side portion may comprise two or more arc-shaped slots and the base fixed to the vehicle frame may comprise two or more guide members each of which extends into a corresponding one of the two or more arc-shaped slots in the mount structure side portion.

The base may further comprise a rack provided with teeth. The locking device may comprise a lever and pawl structure pivotably coupled to the armrest apparatus, and a biasing element for biasing the lever and pawl structure in a direction such that the pawl moves toward the rack.

The adjustable armrest mechanism may further comprise structure for applying a force to the armrest apparatus in a direction away from the base. The force applying structure may comprise a spring, gas-filled strut or like device positioned between the base and the armrest apparatus.

In accordance with one embodiment of the present invention, the armrest apparatus may comprise a mount structure including a side portion, an upper portion and a tab, and a pad positioned on the mount structure upper portion. The tab may be gripped by an operator to move the armrest apparatus relative to the base.

In accordance with a second aspect of the present invention, an adjustable armrest mechanism is coupled to a frame of a materials handling vehicle and spaced from a control handle also coupled to the vehicle frame. The armrest mechanism comprises a base fixed to the vehicle frame and located a distance from the control handle, armrest apparatus pivotally coupled to the base such that the armrest apparatus pivots about a virtual pivot point located in front of the armrest apparatus, the base and the control handle, and a locking device for releasably locking the armrest apparatus to the base in one of at least two positions.

In accordance with a third aspect of the present invention, an adjustable armrest mechanism is provided, which is adapted to be coupled to a vehicle frame. The armrest mechanism comprises a base fixed to the vehicle frame, armrest apparatus movably coupled to the base such that the armrest apparatus moves relative to the base, and a device spaced from an edge of the armrest apparatus for supporting the weight of the armrest apparatus and an operator's arm resting on the armrest apparatus. The device may comprise a locking device for releasably locking the armrest apparatus to the base in one of at least two positions.

The armrest apparatus may comprise a mount structure including a side portion provided with at least one non-linear slot and an upper portion, and a pad positioned on the mount structure upper portion. The upper portion may have outer side edges. Preferably, the device is substantially centered between the upper portion outer side edges.

DETAILED DESCRIPTION OF THE INVENTION

The present invention is described herein with reference to a stand-up counterbalanced truck 10. It will be apparent to those skilled in the art that the invention and variations of the invention can be more generally applied to a variety of other materials handling vehicles.

Figure 1:
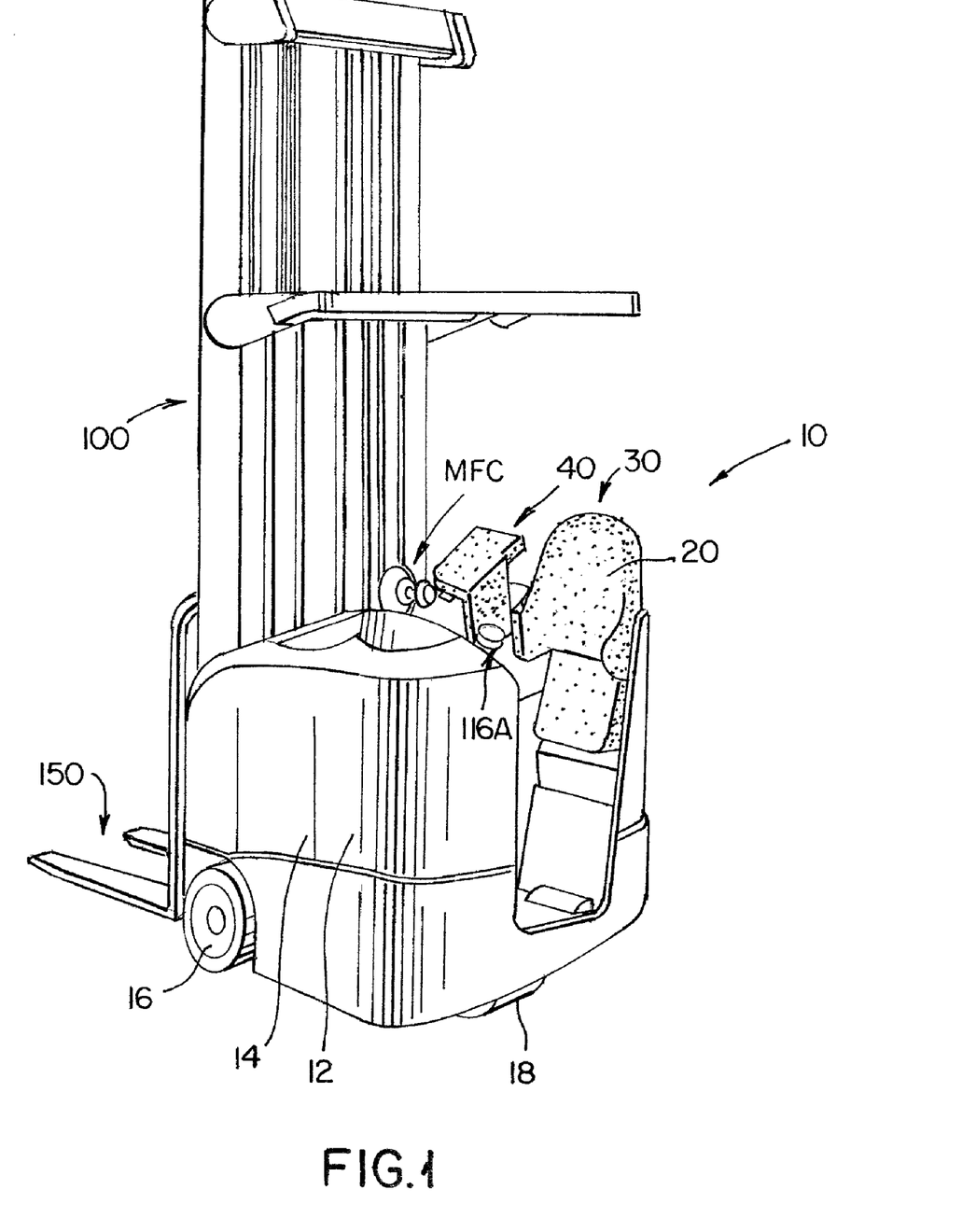
FIG. 1 is a perspective view of a fork lift truck in which an armrest mechanism of a first embodiment of the present invention is incorporated.

Reference is now made to FIG. 1, which is a perspective view of the stand-up counterbalanced fork lift truck 10. The fork lift truck 10 comprises a main body 12 comprising a frame 14, first and second driven wheels coupled to a front portion of the frame 14, only the first wheel 16 is illustrated in FIG. 1, and a third steerable wheel 18 coupled to a rear portion of the frame 14. The first, second and third wheels 16 and 18 allow the truck 10 to move across a floor surface. The truck 10 further comprises a mast assembly 100 coupled to the main body frame 14 and a fork carriage assembly 150 coupled to the mast assembly, see FIG. 1.

Figures 2, 5A, 5B:
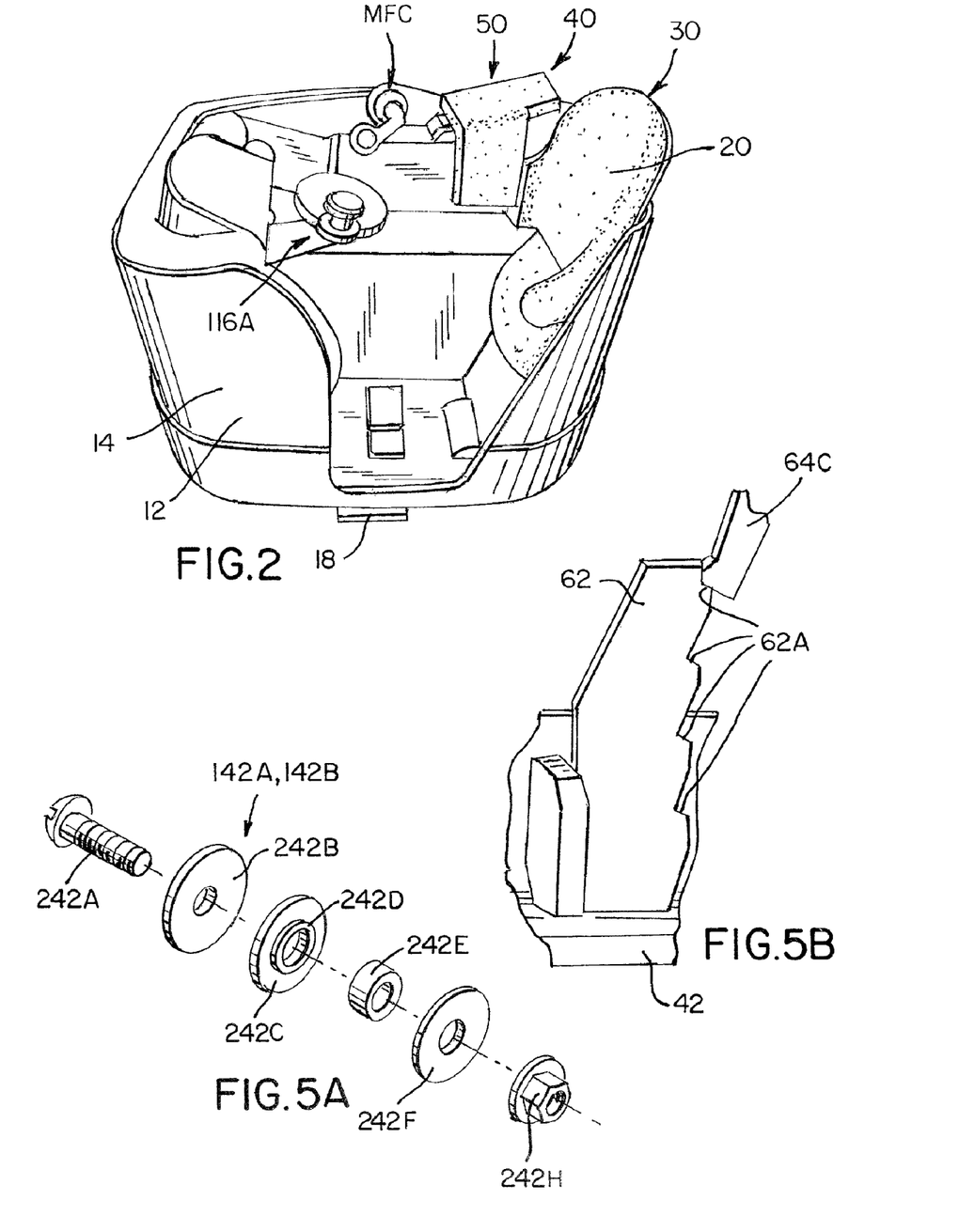
FIG. 2 is a rear view of the fork lift truck of FIG. 1, with the mast and fork carriage assemblies removed.
FIG. 5A is an exploded view of a guide member of the armrest mechanism of FIG. 4.
FIG. 5B is an enlarged view of the rack of the armrest mechanism of FIG. 4.
Figure 3:
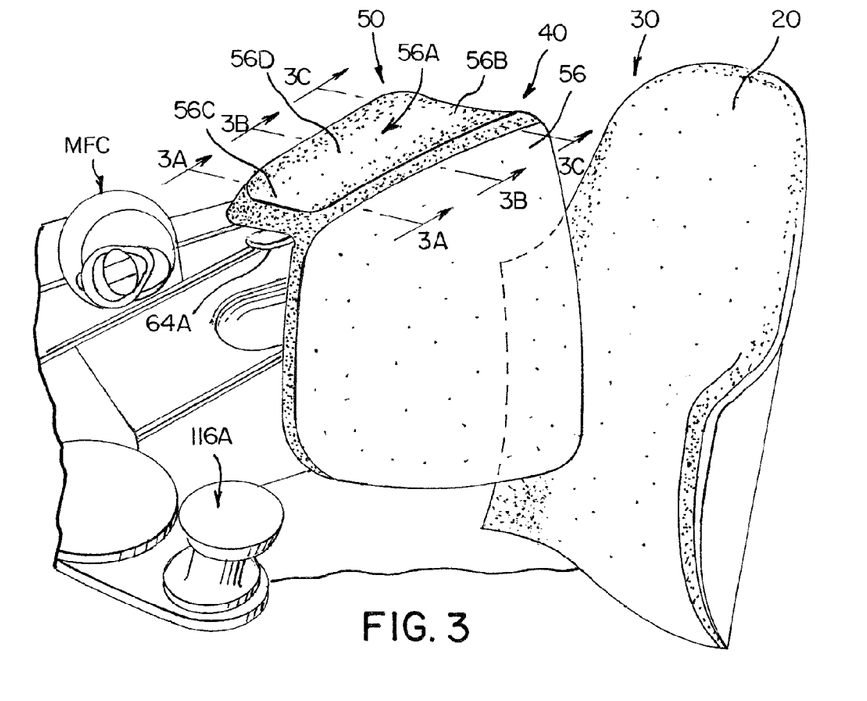
FIG. 3 is a perspective view of a portion of a passenger compartment within the truck of FIG. 1 illustrating the armrest mechanism of the first embodiment of the present invention.
Figures 3A, 3B, 3C:
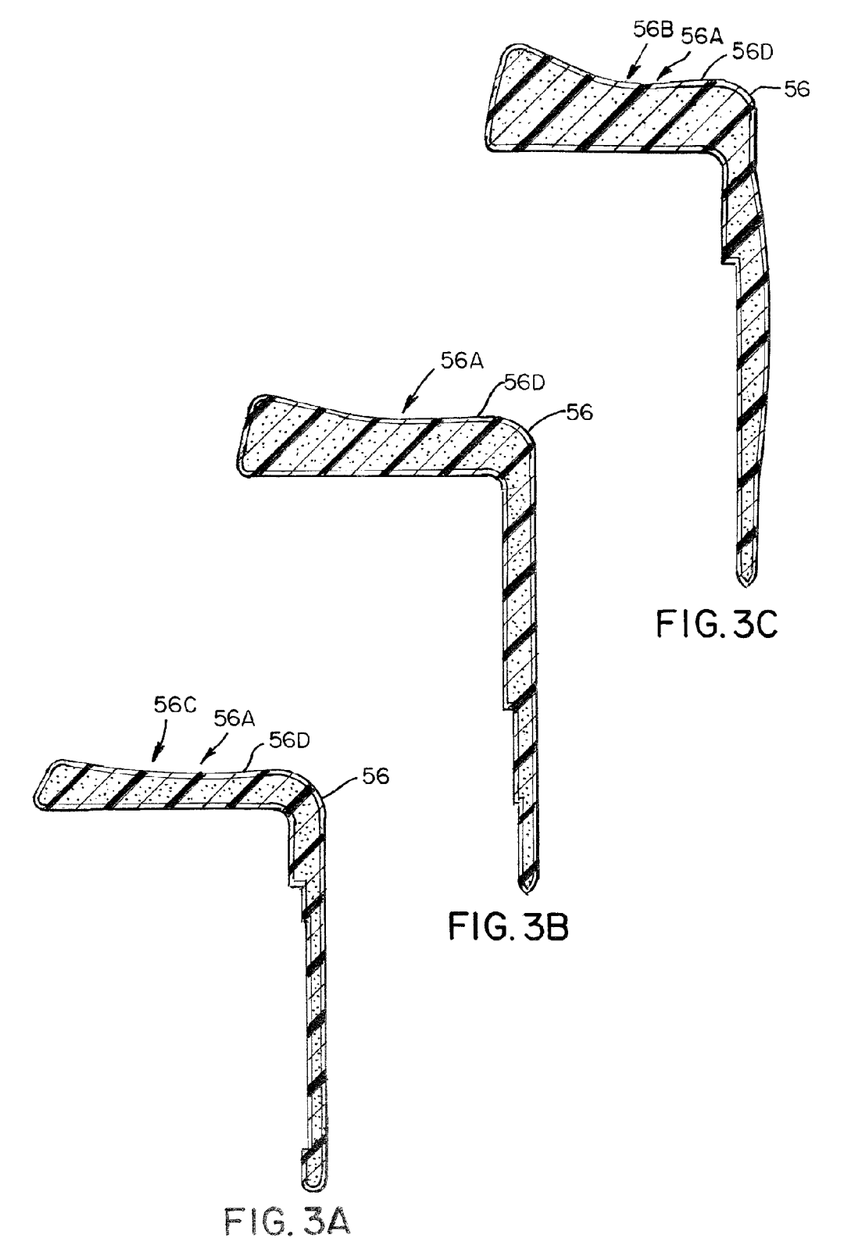
FIG. 3A is a sectional view taken along section line 3A-3A in FIG. 3.
FIG. 3B is a sectional view taken along section line 3B-3B in FIG. 3.
FIG. 3C is a sectional view taken along section line 3C-3C in FIG. 3.

A rider compartment 30 is located within the main body frame 14 for receiving an operator, see FIGS. 1 and 2. Mounted within the rider compartment 30 is a multifunction controller MFC and a tiller 116A. The speed and direction of movement (forward or reverse) of the truck 10 can be controlled by the operator via the multifunction controller MFC. Steering is effected via the tiller 116A.

Mounted within the rider compartment 30 is an operator's back rest 20. Adjacent to the back rest 20 is an adjustable armrest mechanism 40 constructed in accordance with a first embodiment of the present invention, see FIGS. 1-7. The armrest mechanism 40 comprises a base 42 fixed to the vehicle frame 14 and an armrest apparatus 50 movably coupled to the base 42. The base 42 comprises a support frame 42A bolted, welded or otherwise fixed to the main body frame 14, see FIG. 4. The base 42 further comprises first and second guide members 142A and 142B coupled to the support frame 42A so as to remain in a fixed position on the support frame 42A, see FIGS. 4 and 5. Each first and second guide member 142A, 142B comprises a bolt 242A, a flat washer 242B, a first bushing guide 242C with a shoulder 242D facing away from the washer 242B, a spacer 242E, a second bushing guide 242F with a shoulder (not shown) facing toward the spacer 242E, and a nut 242H, see FIG. 5A. The bushing guides 242C and 242F may be formed, for example, from a polymeric material. The bolt 242A, flat washer 242B, spacer 242E and nut 242H may be formed, for example, from a metal.

Figure 4:
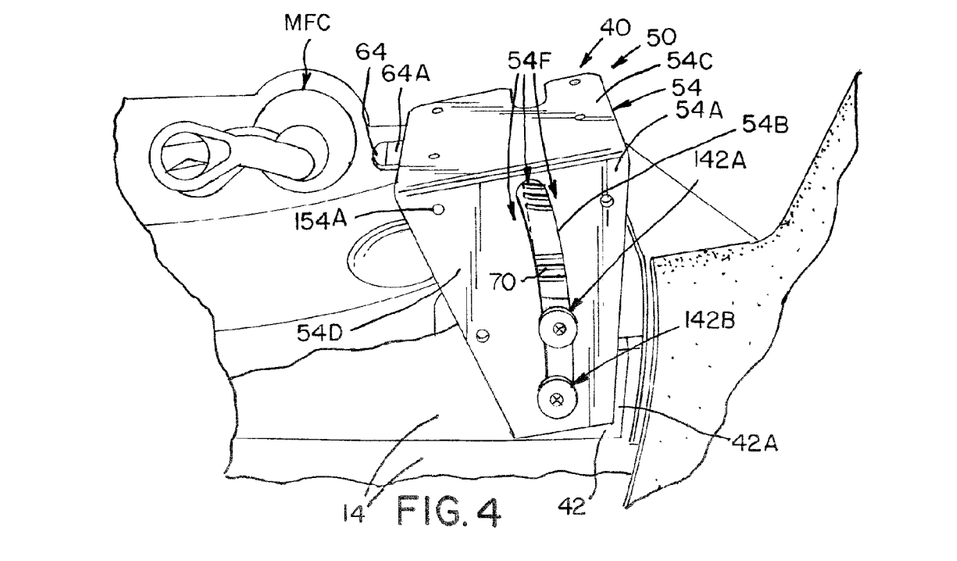
FIG. 4 is a perspective view of a portion of the passenger compartment within the truck of FIG. 1 illustrating the armrest mechanism of the first embodiment of the present invention with a pad removed from a mount structure.
Figure 5:
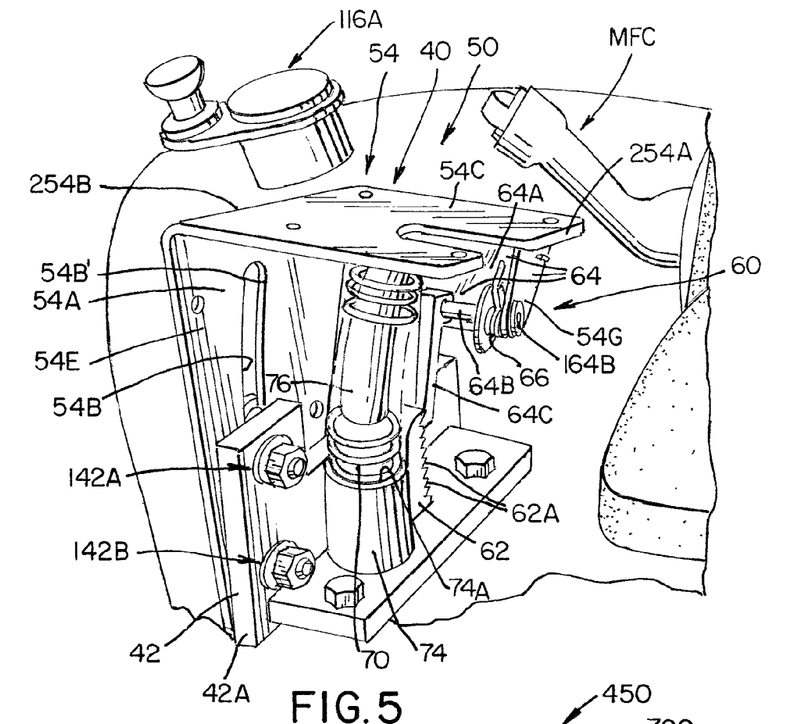
FIG. 5 is a perspective rear view of the armrest mechanism of FIG. 4.

The armrest apparatus 50 comprises in the illustrated embodiment a mount structure 54 and a pad 56 mounted on the mount structure 54, see FIGS. 3-7 (the pad 56 is not illustrated in FIGS. 4 and 5). The mount structure 54 includes, in the illustrated embodiment, a first side portion or plate 54A provided with an arc-shaped slot 54B and an upper portion or plate 54C. The pad 56 may be formed from a polymeric material. The pad 56 may be mounted to the mount structure upper portion 54C via screws. The arc-shaped slot 54B may have a generally constant radius of from about 480 mm to about 720 mm and preferably about 600 mm.

In the illustrated embodiment, the pad 56 is formed with a contoured receiving surface 56A for receiving an operator's elbow E and forearm F, see FIGS. 3, 3A-3C, 6 and 7. As is apparent from FIGS. 3A-3C, the pad 56 has its greatest thickness at a rear portion 56B and its least thickness at a front portion 56C. Further, the contoured receiving surface 56A slopes downward towards the multifunction controller MFC at an angle of about 6 degrees to horizontal, i.e., 6 degrees to a substantially planar bottom surface of the pad 56.

As can be seen in FIG. 4, the guide members 142A and 142B extend into the arc-shaped slot 54B in the mount structure side portion 54A. For each guide member 142A, 142B, see FIG. 5A, the first bushing guide 242C is positioned facing an outer surface 54D of the mount structure side portion 54A such that the first bushing guide shoulder 242D contacts the outer surface 54D and an inner edge surface 54B' of the slot 54B, see FIGS. 4 and 5. Also for each guide member 142A, 142B, the second bushing guide 242F is positioned facing an inner surface 54E of the mount structure side portion 54A such that the second bushing guide shoulder contacts the inner surface 54E and the inner edge surface 54B' of the slot 54B, see FIG. 5. A portion 54F of the mount structure side portion 54A defines the slot 54B, see FIG. 4.

The armrest apparatus 50 is capable of moving along an arc-shaped path relative to the base 42 due to the slot-defining portion 54F of the mount structure side portion 54A engaging and moving relative to the stationary guide members 142A, 142B. For example, in the illustrated embodiment, any given point on the armrest apparatus 50 moves along an arc-shaped path having a generally constant radius. It is contemplated that a top surface 56D of the pad 56 may move through an angular range of from about 0 degree to about 20 degrees and preferably from about 6 degrees to about 18 degrees.

Figure 6:
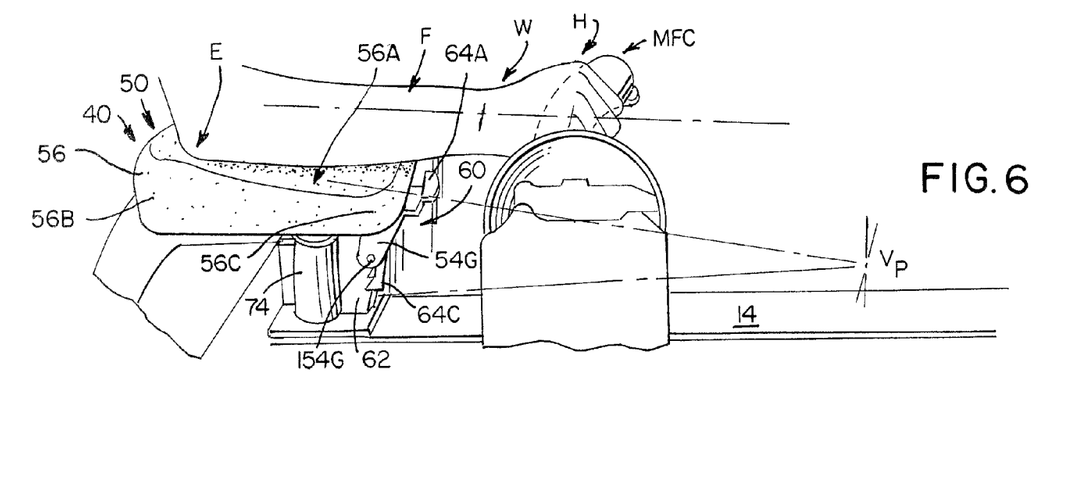
FIG. 6 is a perspective view of the armrest mechanism of the first embodiment with the armrest apparatus illustrated in a lowermost or down position and with a multifunction controller illustrated.
Figure 7:
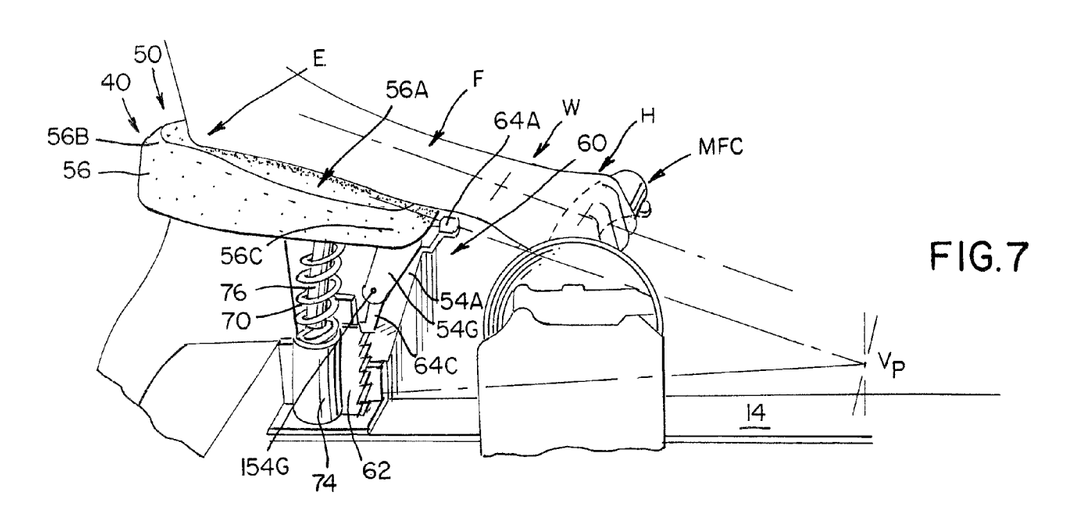
FIG. 7 is a perspective view of the armrest mechanism of the first embodiment with the armrest apparatus illustrated in an uppermost position and with the multifunction controller illustrated.

The armrest apparatus 50 may be releasably locked in any one of a number of spaced-apart positions relative to the base 42. In FIG. 6, the armrest apparatus 50 is shown located in a lowermost position, which is a position that may be used by a short operator. In FIG. 7, the armrest apparatus 50 is shown located in an uppermost position, which is a position that may be used by a tall operator. A locking device 60 is provided for releasably locking the armrest apparatus 50 in a selected position relative to the base 42. The locking device 60 comprises a rack 62 fixedly coupled to the base 42, see FIG. 5. The rack 62 is provided with a plurality of teeth 62A, see FIG. 5B. The locking device 60 further comprises a lever and pawl structure 64 pivotally mounted to the mount structure 54 and a spring 66, see FIG. 5. The lever and pawl structure 64 comprises a gripping handle 64A, a shaft 64B and a pawl 64C. The handle 64A, shaft 64B and pawl 64C are integral with one another in the illustrated embodiment. The shaft 64B extends into an opening 154A in the mount structure first side portion 54A and an opening 154G in a second side portion 54G of the mount structure 54 so as to allow the structure 64 to pivot relative to the mount structure 54, see FIGS. 4 and 7. Appropriate elements, such as spring-biased clips 164B (see FIG. 5; not shown in FIGS. 4, 6 and 7) or like elements are used to maintain the shaft 64B mounted to the first and second side portions 54A and 54G. The spring 66 engages the handle 64A and the mount structure second side portion 54G so as to bias the pawl 64C toward the rack 62, see FIG. 5.

The locking device 60 also functions to support the weight of the mount structure 54, the pad 56 and an operator's arm. Preferably, the pawl 64C is substantially centered under the upper plate 54C between outer side edges 254A and 254B of the upper plate 54C, see FIG. 5, so that the combined weight of the operator's arm, the mount structure 54 and the pad 56 is generally centrally supported by the locking device 60.

In the illustrated embodiment, as the armrest apparatus 50 moves along its arc-shaped path relative to the base 42, it is caused to pivot about a virtual pivot point $V_P$ located in front of the armrest apparatus 50, the base 42, and the multifunction controller MFC, see FIGS. 6 and 7. Due to the downwardly sloping contoured receiving surface 56A provided on the pad 56 and the armrest apparatus 50 being adjustable along its arc-shaped path, operators of differing heights may rest their elbow E and forearm F on the armrest apparatus 50, after an appropriate adjustment to the armrest apparatus 50 has been effected, without being required to raise their elbow E and forearm F too high or too low or lean too much to the side to contact the armrest apparatus 50. Further, the angular orientation of an operator's wrist W relative to his/her forearm F, after a corresponding adjustment to the armrest apparatus 50 has been effected, remains substantially the same for generally any operator including a short or a tall operator, i.e., the wrist W is not substantially flexed upward or downward when the operator's hand H grips the multifunction controller MFC, see FIGS. 6 and 7.

The adjustable armrest mechanism 40 further comprises a spring 70 for applying a force to the armrest apparatus 50 in a direction away from the base 42 so as to assist an operator when the operator moves the armrest apparatus 50 in a direction away from the base 42, see FIGS. 5 and 7. Fixed to the base 42 is an tube-like member 74 having an opening 74A for receiving a first end of the spring 70. A second end of the spring 70 is fitted over a curved shaft 76 extending downward from a lower surface of the mount structure upper portion 54C, see FIG. 7.

Figure 8:
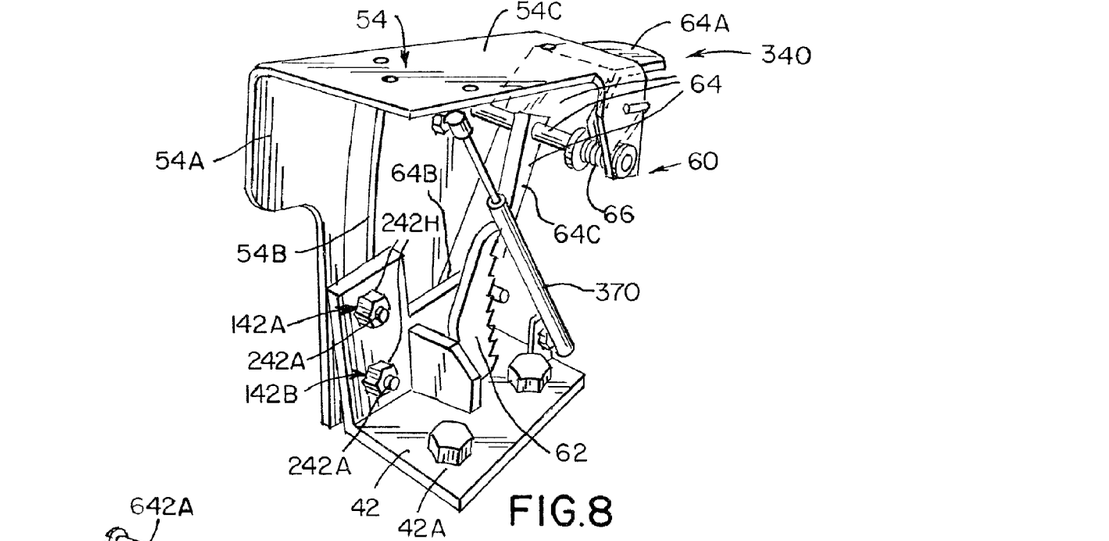
FIG. 8 is a perspective rear view of an armrest mechanism of a second embodiment of the present invention.

An adjustable armrest mechanism 340 constructed in accordance with a second embodiment of the present invention is illustrated in FIG. 8, where like reference numerals indicate like elements. The armrest mechanism 340 is constructed in generally the same manner as the armrest mechanism 40 of the first embodiment except that a gas-filled strut 370 is coupled between the base 42 and the upper portion 54C of the mount structure 54 instead of a spring. An example gas-filled strut is one which is commercially available from Stabilus corporation under the product designation Lift-O-Mat, Number 1417 EP. The strut 370 is coupled to the base 42 and the mount structure upper portion 54C via bolts, studs, welds and the like. Because a strut 370 is provided in this embodiment, the armrest mechanism 340 lacks an open tube-like member 74 and a curved shaft 76. The strut 370 functions to bias the armrest apparatus 50 of the armrest mechanism 340 in a direction away from the base 42. A pad 56 is provided on the mount structure upper portion 54C, just as in the embodiment illustrated in FIG. 3, but is not illustrated in FIG. 8.

Figure 9:
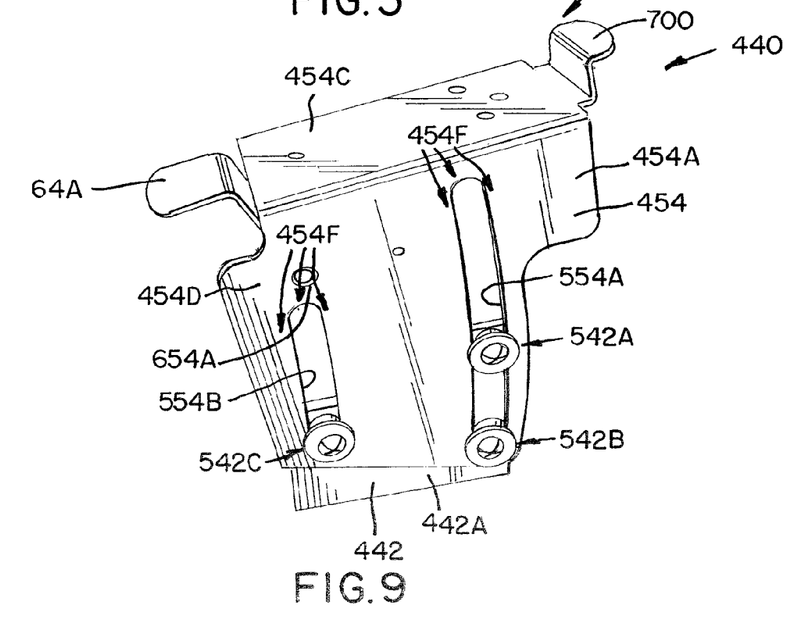
FIG. 9 is a perspective view of an armrest mechanism of a third embodiment of the present invention.
Figure 10:
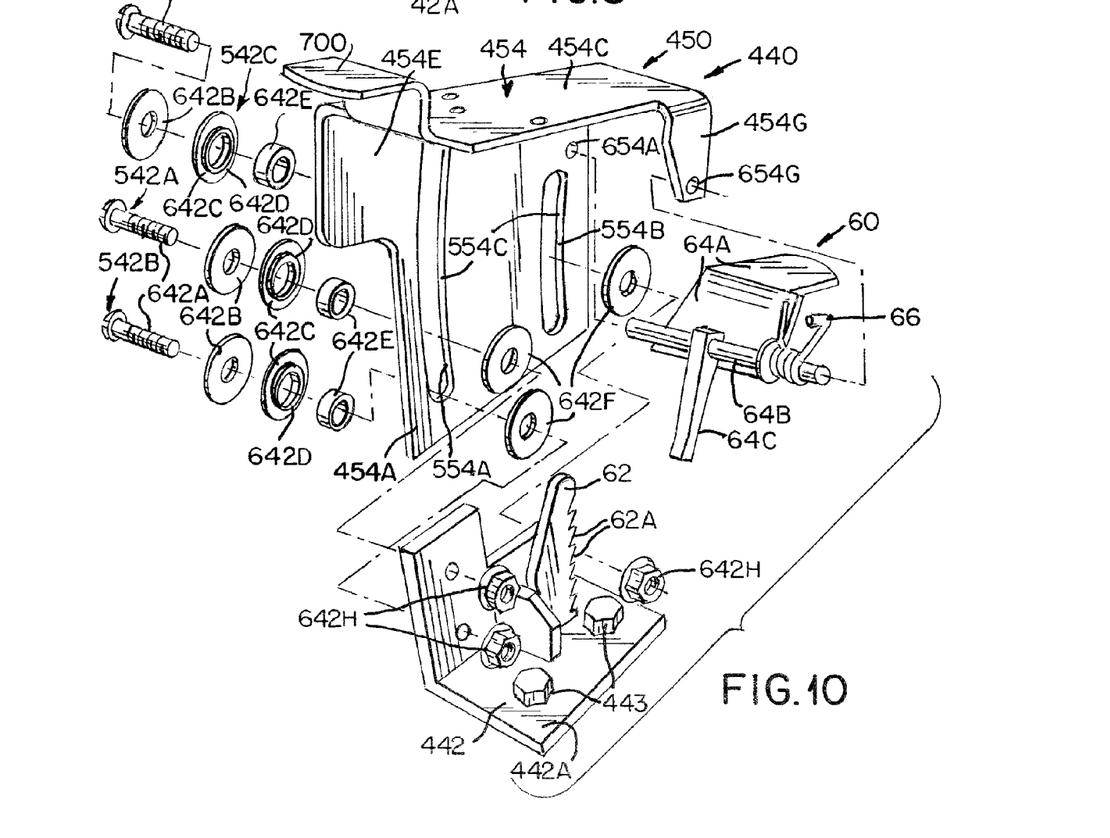
FIG. 10 is an exploded view of the armrest mechanism shown in FIG. 9.

An adjustable armrest mechanism 440 constructed in accordance with a third embodiment of the present invention is illustrated in FIGS. 9 and 10, where like reference numerals indicate like elements. The armrest mechanism 440 comprises a base 442 fixed to the vehicle frame (not shown) and an armrest apparatus 450 movably coupled to the base 442. The base 442 comprises a support frame 442A, which, in the illustrated embodiment, is secured to the vehicle frame via bolts 443. The base 442 further comprises first, second and third guide members 542A-542C coupled to the support frame 442A so as to remain in a fixed position on the support frame 442A. Each first, second and third guide member 542A-542C comprises a bolt 642A, a flat washer 642B, a first bushing guide 642C with a shoulder 642D facing away from the washer 642B, a spacer 642E, a second bushing guide 642F with a shoulder (not shown) facing toward the spacer 642E, and a nut 642H, see FIG. 10.

The armrest apparatus 450 comprises in the illustrated embodiment a mount structure 454 and a pad (not shown) mounted on the mount structure 454. The pad is similar to the pad 56 illustrated in FIG. 3 and is coupled to the mount structure 454 in the same manner that pad 56 is mounted to the mount structure 54 in the FIG. 3 embodiment. The pad includes a contoured receiving surface similar to the contoured receiving surface 56A provided in the pad 56. The mount structure 454 includes, in the illustrated embodiment, a first side portion or plate 454A provided with first and second arc-shaped slots 554A and 554B and an upper portion or plate 454C. The arc-shaped slot 554A may have a radius of from about 520 to about 760 and preferably about 640 mm. The arc-shaped slot 554B may have a radius of from about 400 to about 640 and preferably about 521 mm.

As can be seen in FIG. 9, the guide members 542A-542C extend into the arc-shaped slots 554A and 554B in the mount structure side portion 454A. For each guide member 542A-542C, the first bushing guide 642C is positioned facing an outer surface 454D of the mount structure side portion 454A such that the first bushing guide shoulder 642D contacts the outer surface 454D and an inner edge surface 554C of a corresponding slot 554A and 554B, see FIGS. 9 and 10. Also for each guide member 542A-542C, the second bushing guide 642F is positioned facing an inner surface 454E of the mount structure side portion 454A such that the second bushing guide shoulder contacts the inner surface 454E and the inner edge surface 554C of a corresponding slot 554A and 554B, see FIG. 10. Portions 454F of the mount structure side portion 454A define the slots 554A and 554B, see FIG. 9.

In the illustrated embodiment, the armrest apparatus 450 is capable of moving along an arc-shaped path relative to the base 442 due to the slot-defining portions 454F of the mount structure side portion 454A engaging and moving relative to the guide members 542A-542C.

The armrest apparatus 450 may be releasably locked in any one of a number of spaced-apart positions relative to the base 442. A locking device 60 is provided for releasably locking the armrest apparatus 450 in a selected position relative to the base 442. The locking device 60 comprises the same elements as the locking device 60 described above and illustrated in FIG. 5. Hence, the locking device 60 comprises a rack 62 fixedly coupled to the base 442. The rack 62 is provided with a plurality of teeth 62A. The locking device 60 further comprises a lever and pawl structure 64 pivotally mounted to the mount structure 454 and a spring 66. The shaft 64B of the lever and pawl structure 64 extends into an opening 654A in the mount structure first side portion 454A and an opening 654G in a second side portion 454G of the mount structure 454 so as to allow the structure 64 to pivot relative to the mount structure 454.

As the armrest apparatus 450 moves along its arc-shaped path relative to the base 442, it is caused to pivot about a virtual pivot point (not shown) located in front of the armrest apparatus 450 and the base 442. Due to the downwardly sloping contoured receiving surface provided in the pad and the armrest apparatus 450 being adjustable along its arc-shaped path, operators of different heights may rest their elbow and forearm on the armrest apparatus 450, after an appropriate adjustment to the armrest apparatus 450 has been effected, without being required to raise their elbow and forearm too high or too low or lean too much to the side to contact the armrest apparatus 450. Further, the angular orientation of an operator's wrist relative to his/her forearm F, after a corresponding adjustment to the armrest apparatus 450 has been effected, remains substantially the same for generally any operator including a short or a tall operator, i.e., the wrist W is not substantially flexed upward or downward when an operator's hand H grips the multifunction controller MFC.

The armrest mechanism 440 illustrated in FIGS. 9 and 10 lacks an active device for applying a biasing force to the mount structure 454 in a direction away from the base 442. Instead, the mount structure 454 is provided with an integral gripping tab 700, which an operator may grip while simultaneously lifting up on gripping handle 64A to move the armrest apparatus 450 towards or away from the base 442. Releasing the gripping handle 64A causes the pawl 64C to engage a nearby tooth 62A so as to releasably lock the armrest mechanism 440 in a desired position relative to the base 442.

It is further contemplated that each of the armrest apparatuses of the present invention may move along a varying arc path, for example, as defined by a four-bar linkage, yet still allow an operator's wrist W, for generally all operators including both tall and short operators, to remain in a neutral position after a corresponding adjustment to the armrest apparatus has been effected, i.e., the operator's wrist is not substantially flexed upward or downward when the operator's hand grips the multifunction controller MFC.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An adjustable armrest mechanism coupled to a frame of a materials handling vehicle and spaced from a control handle also coupled to the vehicle frame comprising:
   a base fixed to the vehicle frame and located a distance from the control handle;
   armrest apparatus movably coupled to said base such that said armrest apparatus moves relative to the control handle and pivots about a virtual pivot point in front of the control handle, said armrest apparatus comprising a mount structure including a side portion provided with at least one arc-shaped slot and an upper portion, and a pad positioned on said mount structure upper portion;
   a locking device for releasably locking said armrest apparatus to said base in one of at least two positions; and
   wherein said base comprises a support frame fixed to said vehicle frame and at least one guide member coupled to said support frame so as to remain in a fixed position on said support frame, said guide member extending into said arc-shaped slot in said mount structure side portion such that said mount structure moves along an arc-shaped path relative to said support frame.

2. An adjustable armrest mechanism as set forth in claim 1, wherein said mount structure side portion comprises two or more arc-shaped slots and said base fixed to said vehicle frame comprises two or more guide members each of which extends into a corresponding one of said two or more arc-shaped slots in said mount structure side portion.

3. An adjustable armrest mechanism as set forth in claim 1, wherein said base further comprises a rack provided with teeth.

4. An adjustable armrest mechanism as set forth in claim 3, wherein said locking device comprises:
   a lever and pawl structure pivotably coupled to said armrest apparatus; and
   a biasing element for biasing said lever and pawl structure in a direction such that said pawl moves toward said rack.

5. An adjustable armrest mechanism as set forth in claim 1, further comprising structure for applying a force to said armrest apparatus in a direction away from said base.

6. An adjustable armrest mechanism as set forth in claim 5, wherein said force applying structure comprises a spring positioned between said base and said armrest apparatus.

7. An adjustable armrest mechanism as set forth in claim 5, wherein said force applying structure comprises a gas-filled strut positioned between said base and said armrest apparatus.

8. An adjustable armrest mechanism as set forth in claim 1, wherein said mount structure including a tab adapted to be gripped by an operator to move said armrest apparatus relative to said base.

9. An adjustable armrest mechanism as set forth in claim 1, wherein the virtual pivot point is spaced away from said control handle, said base and said armrest apparatus.

10. An adjustable armrest mechanism as set forth in claim 1, wherein said control handle is located generally mid-way between said armrest apparatus and the virtual pivot point.

11. An adjustable armrest mechanism coupled to a frame of a materials handling vehicle and spaced from a control handle also coupled to the vehicle frame comprising:
- a base fixed to the vehicle frame and located a distance from the control handle;
- armrest apparatus pivotally coupled to said base such that said armrest apparatus pivots about a virtual pivot point located in front of said armrest apparatus, said base and said control handle, said armrest apparatus comprising a mount structure including a side portion provided with at least one arc-shaped slot and an upper portion, and a pad positioned on said mount structure upper portion;
- a locking device for releasably locking said armrest apparatus to said base in one of at least two positions; and
- wherein said base comprised a support frame fixed to said vehicle frame and at least one guide member coupled to said support frame so as to remain in a fixed position on said support frame, said guide member extending into said arc-shaped slot in said mount structure side portion such that said mount structure move along an arc-shaped path relative to said support frame.

12. An adjustable armrest mechanism as set forth in claim 11, wherein said mount structure side portion comprises two or more arc-shaped slots and said base fixed to said vehicle frame comprises two or more guide members each of which extends into a corresponding one of said two or more arc-shaped slots in said mount structure side portion.

13. An adjustable armrest mechanism as set forth in claim 11, wherein said base further comprises a rack provided with teeth.

14. An adjustable armrest mechanism as set forth in claim 13, wherein said locking device comprises:
- a lever and pawl structure pivotably coupled to said armrest apparatus; and
- a biasing element for biasing said lever and pawl structure in a direction such that said pawl moves toward said rack.

15. An adjustable armrest mechanism as set forth in claim 11, further comprising structure for applying a force to said armrest apparatus in a direction away from said base.

16. An adjustable armrest mechanism as set forth in claim 15, wherein said force applying structure comprises a spring positioned between said base and said armrest apparatus.

17. An adjustable armrest mechanism as set forth in claim 15, wherein said force applying structure comprises a gas-filled strut positioned between said base and said armrest apparatus.

18. An adjustable armrest mechanism adapted to be coupled to a vehicle frame comprising:
- a base fixed to the vehicle frame;
- armrest apparatus movably coupled to said base such that said armrest apparatus moves relative to said base, said armrest apparatus comprising a mount structure including a side portion provided with at least one arc-shaped slot and an upper portion, and a pad positioned on said mount structure upper portion, said upper portion having front, rear and side outer edges;
- a device directly coupled to said base for supporting the weight of said armrest apparatus and an operator's arm resting on said armrest apparatus, wherein said device is substantially centered between said upper portion outer side edges; and
- wherein said base comprised a support frame fixed to said vehicle frame and at least one guide member coupled to said support frame so as to remain in a fixed position on said support frame, said guide member extending into said arc-shaped slot in said mount structure side portion such that said mount structure move along an arc-shaped path relative to said support frame.

19. An adjustable armrest mechanism as set forth in claim 18, wherein said device comprises a locking device for releasably locking said armrest apparatus to said base in one of at least two positions.

* * * * *

UNITED STATES PATENT AND TRADEMARK OFFICE
CERTIFICATE OF CORRECTION

PATENT NO.        : 7,726,745 B2
APPLICATION NO.   : 11/552577
DATED             : June 1, 2010
INVENTOR(S)       : Eugene G. Bruns and Adam M. Ruppert It is certified that error appears in the above-identified patent and that said Letters Patent is hereby corrected as shown below:

In the Claims:

Col. 9, line 18, "wherein said base comprised a support frame" should read --wherein said base comprises a support frame--;

Col. 9, line 23, "that said mount structure move along" should read --that said mount structure moves along--;

Col. 10, line 26, "wherein said base comprised a support frame" should read --wherein said base comprises a support frame--;

Col. 10, line 31, "that said mount structure move along" should read --that said mount structure moves along--.

Signed and Sealed this

Twentieth Day of July, 2010

David J. Kappos
*Director of the United States Patent and Trademark Office*